3,829,517
PRODUCTION OF CYCLOALKYLAROMATICS
Ernest A. Zuech, Bartlesville, Okla., assignor to
Phillips Petroleum Company
No Drawing. Filed Feb. 21, 1973, Ser. No. 334,389
Int. Cl. C07c 15/12
U.S. Cl. 260—668 R                            8 Claims

ABSTRACT OF THE DISCLOSURE

Cycloalkylaromatics are produced from aromatic hydrocarbons in the presence of hydrogen and a ruthenium halide-active clay catalyst which has not been heated under calcination conditions prior to use. Benzene is converted to cyclohexylbenzene in good selectivity over a montmorillonite active clay impregnated with a solution of ruthenium chloride and removal of solvent by heating without calcination at temperatures not exceeding about 380° C. Calcination of the support before impregnation or calcination of the impregnated support results in lower selectivity in the conversion process.

---

This invention relates to the conversion of aromatic hydrocarbons to cycloalkylaromatics and/or alkyl-substituted cycloalkylaromatics. In accordance with one aspect, it relates to an improved process and catalyst for conversion of benzene to cyclohexylbenzene over a catalyst which has not been heated under calcination conditions prior to use. In accordance with a further aspect, this invention relates to an improved catalyst for the conversion of aromatics to cycloalkylaromatics which catalyst has been prepared by impregnation of an active clay with an alcoholic or aqueous solution of a ruthenium halide followed by heating at a temperature below about 380° C. to remove solvent.

Methods are available in the art for the coupling of aromatic nuclei in the presence of molecular hydrogen to produce an at least partially hydrogenated dimer derivative of the aromatic reactant. For example, benzene is converted at elevated temperature to a mixture containing cyclohexylbenzene in the presence of various catalysts. Cyclohexylbenzene is known as a valuable solvent and chemical intermediate. It can be converted in high yield to phenol and cyclohexanone by autooxidation with subsequent acid treatment. None of the prior art methods of producing cyclohexylbenzene have yet been proven for a stable continuous operation necessary for commercial exploitation. Problems therewith include high catalyst cost, catalyst stability and regeneration.

In accordance with the invention, there has been discovered a process utilizing a ruthenium-clay catalyst which provides not only excellent selectivity for the conversion of aromatics to cycloalkylaromatic hydrocarbons, but which is suitable for continuous operation.

Accordingly, an object of the present invention is to provide an improved process for the conversion of aromatic hydrocarbons to cycloalkylaromatic hydrocarbons.

Another object of the invention is to provide an improved process and catalyst for the production of cyclohexylbenzene from benzene.

A further object of this invention is to provide a ruthenium catalyst exhibiting excellent selectivity for the conversion of benzene to cyclohexylbenzene.

Other objects and aspects, as well as the several advantages of the invention will be apparent to those skilled in the art upon reading the specification and the appended claims.

In accordance with the invention, a process is provided for producing cycloalkylaromatics and alkyl-substituted cycloalkylaromatics from aromatic hydrocarbons by contacting a monocyclic aromatic hydrocarbon or alkyl-substituted monocyclic aromatic hydrocarbon with hydrogen in the presence of a ruthenium halide-active clay catalyst which catalyst has been heated at drying temperatures prior to said contacting but at temperatures insufficient to calcine the catalyst composition.

In accordance with a specific embodiment of the invention, a catalyst exhibiting excellent selectivity for the conversion of benzene to cyclohexylbenzene has been prepared by impregnating an active clay with an alcoholic or aqueous solution of a ruthenium halide followed by heating to remove solvent under non-calcination conditions. It has been found that the calcination of the active clay before impregnation or calcination of the impregnated clay results in lower selectivity in the conversion process.

In another embodiment of the nivention, benzene is converted to cyclohexylbenzene in good selectivity over a ruthenium chloride-active clay catalyst which has been prepared by impregnation of the active clay with an alcohol or aqueous solution of ruthenium chloride followed by heating at a temperature not in excess of about 380° C. to remove solvent. The catalyst is preferably used in tablet form although the impregnated powder is suitable. As is demonstrated by the specific working examples herein, benzene is converted to cyclohexylbenzene with good selectivity over the inventive catalyst composite.

The feedstocks which are suitable for use in the present invention are aromatic compounds, i.e., monocyclic aromatic hydrocarbons and alkyl-substituted monocyclic aromatic hydrocarbons. Some specific examples of these are benzene, toluene, the xylenes, and the like, and mixtures thereof.

The present process is effected in the presence of a supported ruthenium catalyst. The ruthenium is applied to the active clay support material as an alcoholic or aqueous solution of a ruthenium halide salt, preferably ruthenium chloride. Following impregnation of the active clay with the soluiton of ruthenium halide salt, the solvent can be removed in vacuo at ambient temperatures, say, about 25° C. The impregnated clay can be further dried by heating at temperatures in the range 110–120° C., although temperatures up to about 380° C. can be used. The heating is continued under conditions and for a period of time sufficient to remove substantially all of the solvent, but the heating is insufficient to calcine the catalyst composition. It has been found that calcination of the active clay support before impregnation or calcination of the impregnated active clay support results in lower selectivity in the conversion process. Alternatively, tablets of the active clay support can be treated with a ruthenium halide solution by means of an atomizing spray.

As indicated above, the support material for the catalyst of the invention is an activated clay. Good results are obtained when a support characterized by montmorillonite structure is impregnated with an alcoholic or aqueous solution of a ruthenium halide followed by heating to remove the solvent. A typical analysis of dry Filtrol Grade-71 clay powder suitable for employment in the practice of the present invention is as follows: 71.2% $SiO_2$, 16.5% $Al_2O_3$, 3.6% $Fe_2O_3$, 3.2% MgO, 2.6% CaO, 1.3% $SO_3$, 1.0% ($K_2O+Na_2O$), and 0.6% $TiO_2$ (analysis on a volatile free basis).

Suitable clays are available commercially as, for example, Filtrol Grade-71, Filtrol Grade-62, Filtrol Grade-49, and the like (sold by Filtrol Corporation, Vernon, Calif.).

The ruthenium halide-active clay catalyst of the invention will contain generally from about 0.001 weight percent to about 10 weight percent ruthenium, preferably 0.05 to 2 weight percent ruthenium.

The aromatic conversion according to the invention can be carried out in the presence of the above-described catalysts at temperatures as low as 100° C. and under hydrogen pressures as low as 100 p.s.i.g. The reaction temperature can be as high as 250° C., but it is preferred that no higher than 175° C. be employed. Hydrogen pressures not exceeding 1,000 p.s.i.g. are also preferred although hydrogen pressures up to about 2000 p.s.i.g. can be used. Space velocity defined as volume of the liquid feed per volume of catalyst per hour (LHSV) should be at least 0.5 and not over about 20. However, it is preferable that the LHSV be at least 2 and not above about 15.

The nature of the reaction lends itself to batch, semi-continuous or continuous operation. However, continuous operation is more suitable for commercial utilization.

The reaction can be conducted in the presence of or in the substantial absence of added reaction solvents or diluents. In the modification wherein added solvent is employed, the solvents which are liquid at reaction temperature and pressure and are inert to the catalyst, reactants and reaction products are suitably employed. Preferred solvents to be utilized in this modification are saturated hydrocarbons of from 6–16 carbon atoms, e.g., acyclic alkanes such as hexane, decane, octane, dodecane, and hexadecane, as well as cycloalkanes such as cyclohexane, cyclooctane, cyclododecane, and decahydronaphthalene.

In summary, the preferred embodiment of the present invention is a process which comprises contacting benzene preferably containing little if any sulfur at a temperature of 110 to 175° C. at a LHSV of 2 to 15, and under hydrogen pressure of 200 to 1,000 p.s.i.g., with a catalyst comprising ruthenium chloride on an active clay support, which catalyst has been prepared by impregnating with an alcoholic or aqueous solution of the ruthenium chloride followed by removal of the solvent by heating under non-calcination conditions at a temperature below about 380° C. Cyclohexylbenzene is recovered from the reaction mixture.

EXAMPLE I

A series of batch runs was carried out for the conversion of benzene to cyclohexylbenzene using active clay supports promoted with ruthenium, nickel and platinum, as well as silica-alumina promoted with ruthenium. These runs were carried out in an autoclave and are presented to demonstrate the differences in the effectiveness of the ruthenium-active clay catalyst of the invention in comparison with other promoted active clay catalysts.

The catalyst for Run 1 was prepared by mixing ruthenium chloride with ethanol and then impregnating Filtrol Grade-71 powder in an amount sufficient to provide a final catalyst containing two percent ruthenium. The ethanol was removed by evaporation and heating in an oven at 100–110° C. for 17 hours. The catalyst for Run 2 was similarly prepared from an ethanolic solution of nickel chloride and was dried overnight in an oven at 120° C.

The catalyst for Run 3 was prepared by mixing chloroplatinic acid with ethanol followed by impregnation of the Filtrol support and evaporation of the ethanol by heating overnight in an oven at 120° C. The Run 4 catalyst was prepared by impregnating a 75/25 silica/alumina support with an ethanolic solution of ruthenium chloride. The ethanol was evaporated by heating overnight at 120° C.

The results of the runs are set forth below in Table I.

TABLE I.—CONVERSION OF BENZENE TO CYCLOHEXYLBENZENE

| Run No. | Percent metal (support) | Temp., °C. | $H_2$, p.s.i.g. | $C_6H_{12}$ | $C_6H_6$ | Intermediate compounds | MeCpBz | CyBz | CyBz/$C_6H_{12}$ |
|---|---|---|---|---|---|---|---|---|---|
| 1 | 2% Ru (Filtrol-71) | 175 | 735 | 15.9 | 74.4 | 0.3 | 0.3 | 9.3 | 0.6 |
| 2 | 2% Ni (Filtrol-71) | 175 | 750 | 5.2 | 92.8 | Trace | 0.1 | 2.0 | 0.4 |
| 3 | 2% Pt (Filtrol-71) | 175 | 750 | 30.6 | 54.4 | 0.4 | 3.7 | 9.7 | 0.3 |
| 4 | 2% Ru (silica-alumina) | 175–181 | 765 | 100 | | | | | |

[1] MeCpBz and CyBz represent, respectively, methycyclopentylbenzene and cyclohexylbenzene.

The runs given in Table I above are cited to demonstrate the following:

(1) Nickel or platinum or Filtrol-71 is less effective than ruthenium on Filtrol-71 (see Runs 1–3), and (2) Ruthenium on silica-alumina is much less effective than ruthenium on Filtrol-71 (compare Run 1 with Run 4). It is to be noted that cyclohexane was the only detectable product in Run 4.

EXAMPLE II

Continuous runs were carried out for the conversion of benzene to cyclohexylbenzene by contacting benzene and hydrogen with Filtrol-62 and Filtrol-71 clay supports containing 0.5 percent ruthenium.

Both catalysts were prepared by impregnating the Filtrol supports with a mixture of ruthenium chloride and ethanol in an amount sufficient to provide a final catalyst containing 0.5 percent ruthenium. The ethanol was removed from the catalyst by heating overnight at 120° C.

The results of the runs are set forth below in Table II.

TABLE II.—CONVERSION OF BENZENE TO CYCLOHEXYLBENZENE

| Run No. | Percent metal (support) | Temp., °C. | $H_2$ p.s.i.g. | $C_6H_{12}$ | $C_6H_6$ | Intermediate compounds | MeCpBz | CyBz | CyBz/$C_6H_{12}$ |
|---|---|---|---|---|---|---|---|---|---|
| 5 | 0.5% Ru (Filtrol-62) | 150 | 500 | 11.6 | 86.2 | Trace | Trace | 2.2 | 0.2 |
| 6 | 0.5% Ru (Filtrol-71) | 150 | 500 | 3.7 | 84.8 | 0.1 | 0.1 | 9.2 | 2.5 |

[1] MeCpBz and CyBz represent, respectively, methylcyclopentylbenzene and cyclohexylbenzene.

The above runs demonstrate that ruthenium on Filtrol-62 is less selective than ruthenium on Filtrol-71.

EXAMPLE III

A series of continuous runs was carried out wherein the catalyst of the invention was prepared without calcination before use and compared with catalysts calcined prior to use.

Table III below demonstrates the effectiveness of a supported catalyst prepared in accordance with the invention (see Run 7). The catalyst for this run was prepared by mixing ruthenium chloride in alcohol and them impregnating powdered Filtrol Grade 71 with an amount of solution sufficient to provide a final catalyst containing one percent ruthenium. The ethanol was removed from the catalyst under reduced pressure and the catalyst was further dried by heating at a temperature of 100–110° C. for three hours. The dried impregnated powder was converted to tablets (3 weight percent graphite was added as processing aid) which were used in the runs shown in Tables III and IV. This catalyst was not calcined prior to use.

Runs 8 and 9 of Table III are shown to demonstrate the decrease in selectivity to cyclohexylbenzene resulting from calcination during catalyst preparation. In all three runs benzene was converted to cyclohexylbenzene.

TABLE III.—CONVERSION OF BENZENE TO CYCLOHEXYLBENZENE

| Run No. | Percent Ru on support | Temp., °C. | $H_2$, p.s.i.g. | Products, weight percent [1] | | | | | |
|---|---|---|---|---|---|---|---|---|---|
| | | | | $C_6H_{12}$ | $C_6H_6$ | Intermediate compounds [2] | MeCpBz | CyBz | CyBz/$C_6H_{12}$ |
| 7 | 1.0 | 150 | 500 | 7.8 | 73.7 | 0.5 | 0.5 | 17.6 | 2.25 |
| 8 [3] | 0.5 | 150 | 500 | 5.8 | 87.2 | Trace | 0.3 | 6.7 | 1.2 |
| 9 [4] | 1.0 | 150 | 500 | 21.9 | 66.3 | 0.2 | 0.2 | 11.3 | 0.5 |

[1] MeCpBa and CyBz represent, respectively, methylcyclopentylbenzene and cyclohexylbenzene. Weight percentages exclude heavies.
[2] Bicyclohexyl is the major component.
[3] Filtrol grade 71 tablets were calcined at 400–460° C. for two hours prior to impregnation with an ethanolic solution of ruthenium chloride.
[4] Filtrol Grade 71 tablets (1% Ru) were calcined at 430–450° C. for two hours in air prior to this run.

Additional runs to further demonstrate the operability of the present invention are shown in Table IV.

TABLE IV

Cyclohexylbenzene from benzene and hydrogen (500 p.s.i.g.) over ruthenium (1%) on Filtrol, 71 tablets [1]

| Run No. | Temp., °C. | LHSV [2] | Products, weight percent | | | | | | |
|---|---|---|---|---|---|---|---|---|---|
| | | | $C_6H_{12}$ | $C_6H_6$ | Intermediate compounds [3] | MeCpBz | CyBz | Heavies | CyBz/$C_6H_{12}$ |
| 10 | 150 | 2 | 8.5 | 68.0 | 0.5 | 0.4 | 17.2 | 5.3 | 2.0 |
| 11 | 150 | 4 | 7.4 | 74.7 | 0.2 | 0.9 | 12.8 | 4.0 | 1.7 |
| 12 | 125 | 3 | 4.7 | 84.1 | 0.1 | 0.1 | 9.4 | 1.6 | 2.0 |
| 13 | 125 | 4 | 4.2 | 84.8 | 0.1 | 0.1 | 9.4 | 1.4 | 2.2 |
| 14 | 125 | 6 | 2.8 | 88.0 | 0.1 | 0.1 | 7.9 | 1.1 | 2.8 |
| 15 | 125 | 6 | 2.7 | 90.2 | 0.05 | 0.05 | 6.4 | 0.6 | 2.4 |

[1] Runs 10 and 11 are downflow runs; the other runs in Table IV are upflow runs.
[2] LHSV represents liquid hourly space velocity.
[3] Bicyclohexyl is the major component.

Attention is called to the fact that the heavies produced in the present inventive cyclohexylbenzene process can be equilibrated with benzene in the presence of a Lewis acid such as aluminum chloride to increase the yield of the desired cyclohexylbenzene. The major by-product components (75 weight percent of the heavies) produced in the inventive process are polycycloalkylaromatics such as dicyclohexylbenzenes and tricyclohexylbenzenes. As is well known in the art, the transalkylation of polycycloalkylaromatics with aromatics can be effected in the presence of acid catalysts such as aluminum chloride, ferric chloride, zinc chloride, boron trifluoride, stannic chloride, polyphosphoric acid, hydrogen fluoride, antimony pentafluoride, and the like. Alternatively, heterogeneous catalysts such as filtrols, zeolites, supported phosphoric acid, fluorided alumina, and the like can also be used.

I claim:

1. A process for producing cycloalkylaromatics and alkyl-substituted cycloalkylaromatics by contacting a monocyclic aromatic hydrocarbon or alkyl-substituted monocyclic aromatic hydrocarbon with hydrogen in the presence of a ruthenium halide-active clay catalyst, said catalyst having been prepared by impregnating an active clay with an alcoholic or aqueous solution of a ruthenium halide in an amount sufficient to form a catalyst comprising from about 0.001 to about 10 weight percent ruthenium followed by removal of alcohol or water by heating at a temperature sufficient to volatilize said alcohol or water and remove same from said catalyst, but insufficient to calcine said catalyst.

2. A process according to claim 1 wherein benzene is converted to cyclohexylbenzene by contacting benzene and hydrogen with a ruthenium chloride-montmorillonite active clay catalyst.

3. A process according to claim 1 wherein said heating is effected at temperatures below about 380° C. and said contacting is effected at a temperature of from about 100° C. to about 250° C. and at a hydrogen pressure of from about 100 p.s.i.g. to about 2,000 p.s.i.g. and said catalyst comprises from about 0.5 to about 2 weight percent ruthenium.

4. A process according to claim 1 wherein said contacting is effected with a ruthenium chloride-montmorillonite active clay catalyst at a temperature of about 110° C. to about 175° C. and a hydrogen pressure in the range of about 200 to about 1,000 p.s.i.g.

5. A process according to claim 1 wherein benzene is converted to cyclohexylbenzene by contacting with a ruthenium chloride-montmorillonite active clay catalyst with the further proviso that the ruthenium chloride is applied to the active clay support in an ethanolic solution and the ethanol is removed by heating at a temperature below the calcination temperature for said catalyst.

6. A process according to claim 1 wherein cyclohexylbenzene is produced by contacting benzene with hydrogen at a temperature in the range 110–175° C. under liquid phase conditions.

7. A process according to claim 6 wherein a liquid phase of benzene and hydrogen is passed through a bed of Filtrol Grade 71 active clay catalyst promoted with ruthenium chloride at a liquid hourly space velocity (LHSV) in the range of 2 to 15 and a hydrogen pressure of 200 to 1,000 p.s.i.g.

8. A process according to claim 6 wherein a liquid phase of benzene and hydrogen is passed through a bed of Filtrol Grade 62 active clay catalyst promoted with ruthenium chloride at a liquid hourly space velocity (LHSV) in the range of 2 to 15 and a hydrogen pressure of 200 to 1,000 p.s.i.g.

References Cited

UNITED STATES PATENTS

| | | | |
|---|---|---|---|
| 2,952,716 | 9/1960 | Haensel | 260—683.65 |
| 3,153,678 | 10/1964 | Logemann | 260—667 |
| 3,274,276 | 9/1966 | Louvar | 260—671 R |
| 3,317,611 | 5/1967 | Louvar et al. | 260—668 F |
| 3,347,945 | 10/1967 | Slaugh | 260—688 F |
| 3,412,165 | 11/1968 | Slaugh et al. | 260—668 R |
| 3,437,710 | 4/1969 | Pollitzer | 260—672 R |
| 3,442,966 | 5/1969 | Pollitzer | 260—672 R |
| 3,527,824 | 9/1970 | Pollitzer | 260—672 T |
| 3,527,825 | 9/1970 | Pollitzer | 260—672 T |
| 3,551,510 | 12/1970 | Pollitzer et al. | 260—671 R |
| 3,555,103 | 1/1971 | Strohmeyer | 260—672 T |
| 3,629,351 | 12/1971 | Olive et al. | 260—672 T |

CURTIS R. DAVIS, Primary Examiner

U.S. Cl. X.R.

260—667